United States Patent Office 3,184,452
Patented May 18, 1965

1

3,184,452

NEW AMINOALKOXY COMPOUNDS AND PROCESS FOR THEIR MANUFACTURE

Jean Druey, Riehen, Kurt Eichenberger, Basel, Paul Schmidt, Therwil, and Alberto Rossi, Basel, Switzerland, assignors to Ciba Corporation, New York, N.Y., a corporation of Delaware

No Drawing. Original application Oct. 24, 1958, Ser. No. 769,321, now Patent No. 3,060,177, dated Oct. 23, 1962. Divided and this application July 24, 1962, Ser. No. 212,126
Claims priority, application Switzerland, Nov. 11, 1957, 52,520; Aug. 29, 1958, 63,405
21 Claims. (Cl. 260—240)

This is a divisional application of our copending application Serial No. 769,321, filed October 24, 1958 and now U.S. Patent No. 3,060,177.

This invention provides new aminoalkoxy compounds, namely, O-aminoalkyl-oximes of heterocyclic aldehydes or ketones, and also salts and quaternary ammonium compounds thereof.

The new compounds possess valuable pharmacological properties and are useful as medicaments and as intermediate products for the manufacture of medicaments. In particular the new oximes afford protection against the effects of esterase inhibitors, and especially cholinesterase inhibitors. Thus, they are able to counteract poisoning caused by organophosphorus cholinesterase inhibitors such as are contained, for example, in insecticides.

Compounds of the type stated can also be used as adjuvants and have bacteriostatic and fungistatic activity and are active against protozoa, such as for example Trypanosoma. In addition, in the form of the quaternary ammonium derivatives, they inhibit spinal polysynaptic transmission. The new compounds have also a protective effect against the so-called radiation-syndrome.

The new aminoalkoxy compounds are preferably derived from aldehydes or ketones of the quinoline, furane, thiophene, pyrazole, indole and more especially the pyridine series. The heterocyclic radicals may be unsubstituted or substituted in any desired manner.

The invention provides more especially compounds of the formula $$R-\overset{R'}{\overset{|}{C}}=N-O-X-R''$$

in which R represents a heterocyclic radical, especially one of those mentioned above, R′ represents hydrogen or a lower aliphatic hydrocarbon radical, such as a lower alkyl group, X represents a lower divalent aliphatic hydrocarbon radical, advantageously a straight or branched lower alkylene radical, and R″ represents a tertiary amino group, and especially one which is disubstituted by lower hydrocarbon radicals of which the chains may be interrupted by hetero atoms, such as a di-(lower-alkyl)-amino group, a lower-alkylene imino group (e.g., piperidino), a lower aza-alkylene imino group (e.g., piperazino) or a lower oxa-alkylene imino group (e.g., morpholino), and also salts and quaternary ammonium compounds thereof, especially lower-alkyl ammonium salts. Lower hydrocarbon radicals are, for example, alkyl or alkylene groups, and especially those containing up to 6 carbon atoms such as methyl, ethyl or ethylene, propyl or propylene or methyl-ethylene, butyl or butylene, or hexyl or hexylene.

Especially valuable are the compounds of the formula $$Py-\overset{R'''}{\overset{|}{C}}=N-O-X-R''$$

in which Py stands for a pyridyl-2, pyridyl-3 or pyridyl-4 radical, R‴ for hydrogen or a lower alkyl, X for a lower

2 alkylene radical and R″ has the meaning given above, but is more especially a lower dialkylamino group, such as a dimethylamino group or diethylamino group, their salts and quaternary bis-(lower alkyl)-ammonium salts, and primarily those of the formula $$Py-CH=N-O-C_2H_4-R''$$

their salts and quaternary bis-(lower alkyl)-ammonium salts, Py and R″ having the meanings given above. As examples there may be mentioned the following substances:

O-[β-(diethyl-methyl-ammonium)-ethyl]-N-methyl-pyridinium-(2)-aldoxime salts of the formula

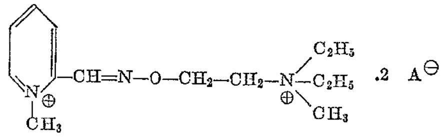

O-[β-(diethyl-methyl-ammonium)-ethyl]-N-methyl-pyridinium-(3)-aldoxime salts of the formula

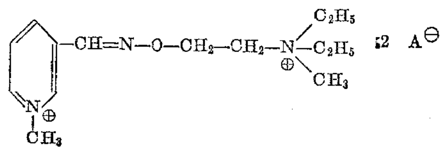

and O-(β-diethylamino-ethyl)-pyridine-(4)-aldoxime of the formula

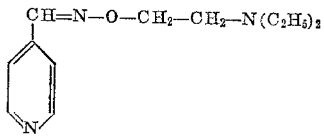

and salts thereof.

The aforesaid salts and the anions A are those of inorganic or organic acids, for example, hydrohalic acids, such as hydrochloric acid, hydrobromic acid and hydriodic acid, sulfuric acid, nitric acid, phosphoric acids, perchloric acid, alkyl-sulfonic acids, such as methane, ethane or hydroxyethane sulfonic acid, benzene sulfonic acids such as para-toluene sulfonic acid, naphthalene sulfonic acids, acetic acid, propionic acid, oxalic acid, tartaric acid, citric acid, lactic acid or maleic acid, benzoic, acid, salicylic acid, para-aminosalicylic acid, amino-acids or alkyl sulfuric acids such as methyl sulfuric acid.

The new compounds are obtained by methods in themselves known. Advantageously a heterocylic aldehyde or ketone, is reacted with an O-alkyl-hydroxylamine substituted in the alkyl group by an amino group or by a radical convertible into such a group, and in the resulting compounds a radical which is convertible into an amino group is so converted.

Another method consists in introducing the amino alkyl radical into an oxime of a heterocyclic aldehyde or ketone. These compounds can be reacted with reactive esters of alkanols which are substituted by an amino group or a radical convertible into such a group, if desired in the form of their salts, and in the resulting compounds a substituent which is convertible into an amino group is so converted.

A radical which can be converted into an amino group is, for example, a free or reactively esterified hydroxyl group, especially a halogen (e.g., chlorine, bromine, etc.) atom or a sulfonyloxy group. The conversion into the amino group can be carried out in the usual manner by esterification, such as halogenation or sulfonyloxylation, e.g., with thionyl chloride or halides of phosphoric acid and/or reaction of the reactively esterified hydroxyl group with ammonia or amines. Reactive esters of alkanols are more especially those of strong inorganic or organic acids, such as hydrohalic acids, for example, hydrochloric acid, hydrobromic acid, or hydroidic acid, or aromatic sulfonic acids, for example, benzene sulfonic acids, such as para-toluene sulfonic acid.

A compound which is obtained at any stage in the process and contains a tertiary amino group may, if desired, be treated with a quaternating agent, especially a reactive ester of a lower alaknol, such as an alkyl halide, a sulfuric acid alkyl ester or a benzene sulfonic acid alkyl ester such as a paratoluene sulfonic acid alkyl ester.

The reactions are carried out by methods in themselves known, if desired, in the presence of a condensing agent, in the presence or absence of a diluent and at the ordinary or a raised temperature under atmospheric or superatmospheric pressure.

The invention also includes a modification of the process, in which there is used as starting material a compound obtainable as an intermediate product at any stage of the process and the remaining steps of the process are carried out.

Depending on the conditions of the process the new compounds are obtained in the form of their free bases or salts. The free bases can be liberated from the salts in the usual manner, for example, by treating the salts with an alkali or in the case of quaternary salts with an anion exchanger. The free bases may be converted into their salts in the usual manner, for example, by reaction with an acid. Examples of acids suitable for salt formation are those mentioned above.

The starting materials are known or can be made by methods in themselves known. There are advantageously used those which lead to final products which are referred to above as being especially valuable.

The new oximes, their salts or quaternary ammonium compounds or mixtures thereof can be used, for example, in the form of pharmaceutical preparations. These preparations contain the active compound in admixture with a pharmaceutical organic or inorganic carrier suitable for enteral, parenteral or topical administration. For these carriers there are used substances which do not react with the active compounds, for example, gelatine, lactose, white petroleum jelly, starches, magnesium stearate, talc, vegetable oils, benzyl alcohols, gums, polyalkylene glycols, cholesterol or other known carrier for medicaments. The pharmaceutical preparations may be in the form, for example, of tablets, dragees, salves or in liquid form as solutions, suspensions or emulsions. If desired, they may be sterilized and/or may contain auxiliary substances, such as preserving, stabilizing, wetting or emulsifying agents. They may also contain other therapeutically valuable substances. The preparations can be made up by the usual methods.

The following examples illustrate the invention:

*Example 1*

10.7 grams of pyridine-(2)-aldehyde are boiled under reflux with 10.4 grams of β-dimethylamino-ethoxy-amine in 100 cc. of absolute ethyl alcohol for 8 hours in an atmosphere of nitrogen. The product is worked up by evaporating the ethyl alcohol in vacuo and fractionating the residue in a high vacuum. There is obtained O-(β-dimethylamino-ethyl)-pyridine-(2)-aldoxime of the formula

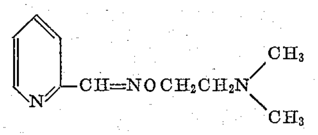

in the form of a colorless oil boiling at 82–83° C. under 0.02 mm. pressure.

The β-dimethylamino-ethoxy-amine used as starting material is prepared as follows:

73 grams of acetone-oxime are added to a solution of 46 grams of sodium in 1000 cc. of absolute ethyl alcohol, and the reaction solution is then evaporated to dryness in vacuo. The residue is suspended in 800 cc. of absolute toluene, and boiled under reflux, while stirring, with 144 grams of (β-chlorethyl)-dimethylamine hydrochloride for 24 hours. After cooling the mixture, the precipitated sodium chloride is filtered off with suction, the residue is extracted once with 150 cc. and three times with 70 cc. of aqueous hydrochloric acid of 18 percent strength on each occasion. After being extracted once with ether, the combined hydrochloric acid extracts are saturated with potassium carbonate and extracted three times with ether. The ethereal solution is dried with sodium sulfate, then evaporated and the residue is distilled. There is obtained O - (β - dimethylamino-ethyl) - acetone-oxime boiling at 52–57° C. under 12 mm. pressure. The distillate is dissolved in 900 cc. of aqueous hydrochloric acid of 18 percent strength. Steam is passed into the solution until at least 5000 cc. have distilled off. The reaction solution is then evaporated to dryness in vacuo, whereupon the dihydrochloride of β-dimethylamino-ethoxy-amine. crystallizes. It melts at 175° C. with decomposition. In order to liberate the base the dihydrochloride is dissolved in a small amount of water, then saturated with potassium carbonate and the mixture is extracted with chloroform. After drying and evaporating the chloroform solution, the residue is fractionated under reduced pressure produced by a water jet pump. There is obtained β-dimethylamino-ethoxy-amine in the form of a colorless oil boiling at 48–50° C. under 13 mm. pressure.

7.72 grams of the O-(β-dimethylamino-ethyl)-pyridine-(2)-aldoxime are dissolved in 120 cc. of absolute ethyl alcohol and 40 parts by volume of an aqueous 1 N-solution of hydrochloric acid are added. The reaction solution is evaporated to drynes, whereupon the monohydrochloride of O-(β-dimethylamino-ethyl)-pyridine-(2)-aldoxime melting at 147–148° C. crystallizes out in pure form.

*Example 2*

7.72 grams of the O-(β-dimethylamino-ethyl)-pyridine-(2)-aldoxime described in Example 1 are dissolved in 30 cc. of absolute alcohol and boiled for 20 minutes under reflux with 16 cc. of methyl iodide. After cooling the mixture, ether is added and the crystals are filtered off. After recrystallization twice from a mixture of alcohol and ether there is obtained O-(β-trimethylammonium-ethyl)-N-methyl-pyridinium-(2) - aldoxime diiodide melting at 196–197.5° C.

*Example 3*

5.35 grams of pyridine-(2)-aldehyde are boiled under reflux for 8 hours in an atmosphere of nitrogen with 6.6 grams of β-diethylamino-ethoxy-amine in 50 cc. of absolute ethyl alcohol. The product is worked up as described in Example 1. There is obtained O-(β-diethylamino-ethyl)-pyridine-(2)-aldoxime of the formula

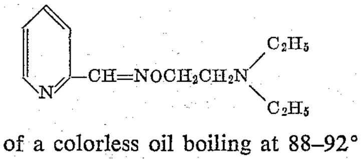

in the form of a colorless oil boiling at 88–92° C. under 0.08 mm. pressure.

The β-diethylamino-ethoxy-amine used as starting material is prepared as follows:

73 cc. of acetone-oxime are added to a solution of 23 grams of sodium in 500 cc. of absolute ethyl alcohol. The reaction solution is evaporated in vacuo and dried until the weight remains constant. The residue is suspended in 800 cc. of absolute toluene and boiled with 135.5 grams of (β-chloroethyl)-diethylamine for 24 hours under reflux while stirring. The further reaction and working up are carried out in a manner analogous to that described in Example 1. The β-diethylamino-ethoxy-amine is a colorless oil boiling at 69–92° C. under 13 mm. pressure. Its dihydrochloride melts at 118–119° C.

8.7 grams of O-(β-diethylamino-ethyl) - pyridine - (2)- aldoxime are dissolved in 120 cc. of absolute alcohol and 39.4 cc. of aqueous 1 N-hydrochloric acid are added.

After evaporating the mixture to dryness in vacuo, the residue is recrystallized once from a mixture of alcohol and ether. There is obtained O-(β-diethylamino-ethyl)- pyridine - (2) - aldoxime monohydrochloride melting at 156–157° C.

*Example 4*

4.42 grams of O-(β-diethylamino-ethyl)-pyridine-(2)- aldoxime are dissolved in 15 c. of absolute alcohol and 8 cc. of methyl iodide are added. After the addition of ether until slight turbidity occurs, the mixture is allowed to stand for 14 hours at room temperature, during which the reaction product begins to crystallize out. After adding further ether the crystals are filtered off and recrystallized from alcohol. There is obtained O-[β-(diethyl-methyl-ammonium)-ethyl]-N - methyl - pyridinium - (2)- aldoxime diiodide melting at 173–174° C.

*Example 5*

10.7 grams of pyridine-3-aldehyde are boiled under reflux with 10.4 grams of β-dimethylamino-ethoxy-amine in 100 parts by volume of absolute alcohol in an atmosphere of nitrogen for 8 hours. The product is worked up in a manner analogous to that described in Example 1. There is obtained O-(β-dimethyl-amino-ethyl)-pyridine-(3)-aldoxime of the formula

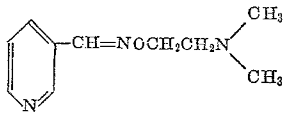

in the form of a colorless oil boiling at 89–90° C. under 0.02 mm. pressure.

4.82 grams of O-(β-dimethylamino-ethyl)-pyridine-(3)- aldoxime are dissolved in 60 cc. of alcohol and 24.5 parts by volume of aqueous 1 N-hydrochloric acid are added. The reaction solution is evaporated to dryness in vacuo and the crystalline residue is recrystallized from a mixture of alcohol and ether. There is obtained O-(β-dimethyl-amino-ethyl)-pyridine-(3) - aldoxime monohydrochloride melting at 109–110° C. It is very strongly hygroscopic.

*Example 6*

5.79 grams of O-(β-dimethylamino-ethyl)-pyridine-(3)- aldoxime are dissolved in 60 parts by volume of absolute alcohol and the mixture is boiled under reflux with 4 parts by volume of methyl iodide for 20 minutes. After cooling the mixture, ether is added. The crystals are filtered off with suction and recrystallized from a mixture of alcohol and ether. There is obtained O-(β-trimethyl-ammonium-ethyl)-N-methyl-pyridinium-(3)-aldoxime di-iodide melting at 228–229° C. with decomposition.

*Example 7*

5.35 grams of pyridine-(3)-aldehyde are boiled under reflux with 6.6 grams of β-diethylamino-ethoxy-amine in 50 parts by volume of absolute alcohol for 8 hours in an atmosphere of nitrogen. The reaction mixture is worked up as described in Example 1. There is obtained O-(β-diethylamino-ethyl)-pyridine-(3)-aldoxime of the formula

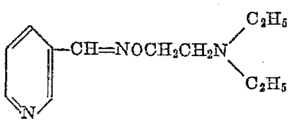

in the form of a colorless oil boiling at 93–94° C. under 0.02 mm. pressure.

5.17 grams of O-(β-diethylamino-ethyl)-pyridine-(3)- aldoxime are dissolved in 75 parts by volume of alcohol and 23.4 cc. of aqueous 1 N-hydrochloric acid are added. The mixture is evaporated to dryness in vacuo and the crystalline residue is recrystallized from a mixture of alcohol and ether. There is obtained O-(β-diethylamino-ethyl)-pyridine-(3)-aldoxime mono-hydrochloride melting at 107–108.5° C.

*Example 8*

9.5 grams of O-(β-diethylamino-ethyl)-pyridine-(3)- aldoxime are dissolved in 86 cc. of absolute alcohol and the mixture is boiled under reflux with 17 cc. of methyl iodide for 20 minutes. After cooling the mixture, ether is added to cause further crystallization. The crystals are filtered off with suction and recrystallized from a mixture of alcohol and ether. There is obtained O-[β-(di-ethyl - methyl - ammonium) - ethyl] - N - methyl - pyridinium-(3)-aldoxime diiodide melting at 195–197° C.

*Example 9*

21.4 parts of pyridine-(4)-aldehyde are boiled under reflux with 20.8 grams of β-dimethylamino-ethoxy-amine for 8 hours in an atmosphere of nitrogen. The reaction mixture is worked up as described in Example 1. There is obtained O-(β-dimethylamino-ethyl)-pyridine-(4)-aldoxime of the formula

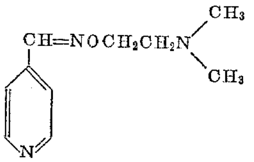

in the form of a colorless oil boiling at 82–84° C. under 0.02 mm. pressure.

1.93 grams of the above base are dissolved in 30 cc. of ethyl alcohol. There are then added 9.5 cc. of aqueous 1 N-hydrochloric acid. The reaction solution is evaporated to dryness in vacuo. From the crystalline residue there is obtained by recrystallization from a mixture of alcohol and ether O-(β-dimethylamino-ethyl)-pyridine-(4) - aldoxime - mono - hydrochloride melting at 129–130° C.

*Example 10*

3.86 grams of O-(β-dimethylamino-ethyl)-pyridine-(4)-aldoxime are dissolved in 40 cc. of absolute alcohol and the mixture is boiled with 8 cc. of methyl iodide for 20 minutes under reflux. After cooling the mixture, ether is added to cause further crystallization. The crystals are filtered off with suction and recrystallized from a mixture of alcohol and ether. There are obtained 8.32 grams of O-(β-trimethyl-ammonium-ethyl)-N-methyl-pyridinium-(4)-aldoxime diiodide melting at 206–207° C.

*Example 11*

5.35 grams of pyridine-4-aldehyde are boiled under reflux with 6.6 grams of β-diethylamino-ethoxy-amine for 8 hours in an atmosphere of nitrogen. The reaction mixture is worked up as described in Example 1. There is obtained O-(β-diethylamino-ethyl)-pyridine-(4)-aldoxime of the formula

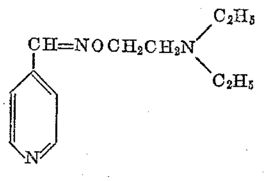

in the form of a colorless oil boiling at 99–101° C. under 0.03 mm. pressure.

4.32 grams of the O-(β-diethylamino-ethyl)-pyridine-(4)-aldoxime are dissolved in 60 cc. of absolute alcohol. There are added 19.6 cc. of aqueous 1 N-hydrochloric acid. After evaporating the reaction solution, the crystalline residue is recrystallized from a mixture of alcohol and ether. There is obtained O-(β-diethylamino-ethyl)-pyridine-(4)-aldoxime monohydrochloride melting at 136–137° C.

*Example 12*

2.21 grams of O-(β-diethylamino-ethyl)-pyridine-(4)-aldoxime are dissolved in 10 cc. of absolute alcohol and the mixture is boiled under reflux for 20 minutes with 4 cc. of methyl iodide. In order to cause further crystallization ether is added, after cooling the mixture. The crystals are filtered off with suction and recrystallized from a mixture of alcohol and ether. There is obtained O-[β-(diethyl-methyl-ammonium)-ethyl]-N-methyl - pyridinium-(4)-aldoxime diiodide melting at 162° C.

*Example 13*

8.25 grams of pyridine-(2:6)-dialdehyde are boiled under reflux with 10.4 grams of β-dimethylamino-ethoxy-amine in 100 cc. of absolute alcohol for 8 hours in an atmosphere of nitrogen. The reaction mixture is worked up as described in Example 1. By fractional distillation there is obtained O:O′-bis-(β-dimethylamino-ethyl)-pyridine-(2:6)-dialdoxime of the formula

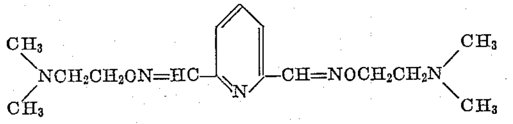

in the form of an oil boiling at 190–200° C. under 0.06 mm. pressure.

6.99 grams of O:O′-bis-(β-dimethylamino-ethyl)-pyridine-(2:6)-dialdoxime are dissolved in 60 cc. of ethyl alcohol and 45 cc. of aqueous 1 N-hydrochloric acid are added. The reaction solution is evaporated in vacuo and the residue is recrystallized from a mixture of alcohol and ethyl acetate. There is obtained O:O′-bis-(β-dimethylamino-ethyl)-pyridine-(2:6)-dialdoxime - dihydrochloride melting at 217–218° C. with decomposition.

*Example 14*

4.66 grams of O:O′-bis-(β-dimethylamino-ethyl)-pyridine-(2:6)-dialdoxime are dissolved in 40 cc. of absolute alcohol and the mixture is boiled under reflux with 1.5 cc. of methyl iodide for 20 minutes. After cooling, ether is added to cause further crystallization. The crystals are filtered off with suction and recrystallized from a mixture of alcohol and ether. There is obtained O:O′-bis-(β-trimethylammonium-ethyl)-N - methyl - pyridinium - (2:6)-dialdoxime diiodide melting at 215–216° C.

*Example 15*

15.7 grams of quinoline-(2)-aldehyde and 13.2 grams of β-diethylamino-ethoxy-amine are boiled under reflux in 180 cc. of absolute alcohol in an atmosphere of nitrogen for 8 hours. After evaporating the ethyl alcohol under a pressure of 11 mm. the residue is fractionated in a high vacuum. There is obtained O-(β-diethylamino-ethyl)-quinoline-(2)-aldoxime of the formula

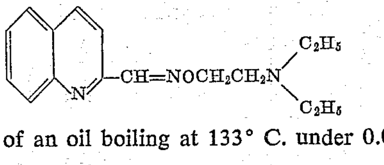

in the form of an oil boiling at 133° C. under 0.03 mm. pressure.

14.42 grams of the above base are dissolved in 150 cc. of alcohol and 53.3 cc. of aqueous 1 N-hydrochloric acid are added. The reaction solution is evaporated to dryness in vacuo and the residue is crystallized from a mixture of alcohol and ether. There is obtained O-(β-diethylamino-ethyl)-quinoline-(2)-aldoxime monohydrochloride melting at 195–196° C.

*Example 16*

5.42 grams of O-(β-diethylamino-ethyl)-quinoline-(2)-aldoxime are dissolved in 40 cc. of absolute alcohol and the mixture is boiled with 4 cc. of methyl iodide under reflux for 20 minutes. After cooling the mixture, ether is added to the reaction mixture and the crystals are filtered off with suction. After recrystallization once from a mixture of alcohol and ether there is obtained O-[β-(diethyl-methylammonium)-ethyl]-quinoline-(2)-aldoxime iodide melting at 144–145° C.

*Example 17*

5.2 grams of β-dimethylamino-ethoxy-amine are dissolved in 50 cc. of absolute alcohol and 7.5 grams of glacial acetic acid are added. 7.05 grams of 5-nitro-furane-(2)-aldehyde in 50 cc. of absolute alcohol are added and the reaction solution is boiled under reflux for 30 minutes in an atmosphere of nitrogen. For the purpose of working up the reaction solution is evaporated. From the dark brown oily residue there is obtained by distillation in a ball tube O-(β-dimethylamino-ethyl)-5-nitro-furane-(2)-aldoxime of the formula

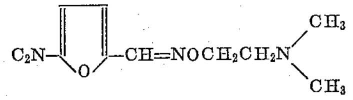

in the form of an oil at a heating temperature of 120–125° C. and under 0.1 mm. pressure of mercury. However, the crude residue can be used for preparing the hydrochloride and the metho-iodide.

16.85 grams of the residue described above are dissolved in 50 cc. of absolute alcohol and the mixture is rendered weakly acid with a 3 N-alcoholic solution of hydrochloric acid. On the addition of ethyl acetate crystallization sets in. The crystals are filtered off with suction and recrystallized once from a mixture of alcohol and ether. There is obtained O-(β-dimethylamino-ethyl)-5-nitro-furane-(2)-aldoxime hydrochloride melting at 171–172° C.

*Example 18*

16.48 grams of the crude O-(β-dimethylamino-ethyl)-5-nitro-furane-(2)-aldoxime described in Example 17 are dissolved in 145 cc. of absolute ethyl alcohol, the mixture is filtered with charcoal and the filtrate is boiled under reflux with 14.5 cc. of methyl iodide for 35 minutes. After cooling the reaction mixture, ether is added thereto, whereupon crystallization sets in. The crystals are filtered off with suction and 280 cc. of alcohol are added. The insoluble portion is filtered off and ether is added to the filtrate. These is obtained O-(β-trimethylammonium-ethyl)-5-nitro-furane-(2)-aldoxime iodide melting at 175–177° C.

*Example 19*

A solution of 6.5 grams of β-dimethylamino-ethoxy-amine and 10 grams of N-methyl-indole-(2)-aldehyde in 40 cc. of absolute alcohol is boiled under reflux in an atmosphere of nitrogen for 8 hours. The greater part of the alcohol is evaporated off under 11 mm. pressure of mercury, and the residue is distilled in a high vacuum, whereby O - (β - dimethylamino-ethyl)-N-methyl-indole-(2)-aldoxime of the formula

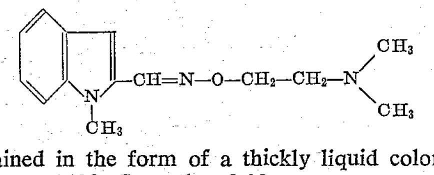

is obtained in the form of a thickly liquid colorless oil boiling at 140° C. under 0.02 mm. pressure. Upon standing, it solidifies in a short time and melts at about 39–40° C.

By adding the calculated quantity of hydrochloric acid in ethyl acetate to a solution of the above base in ethanol there is obtained its hydrochloride, which melts at 183–184° C. after recrystallization from a mixture of ethanol and ether.

*Example 20*

4.8 grams of the O-(β-dimethylamino-ethyl)-N-methyl-indole-(2)-aldoxime are dissolved in 15 cc. of ethyl acetate, 3 grams of methyl iodide are added, and the whole is allowed to stand at room temperature, during which a copious white precipitate is formed.

By recrystallizing the precipitate from methanol there is obtained O - (β-trimethylammonium-ethyl)-N-methyl-indole-(2)-aldoxime iodide in the form of white crystals melting at 232–234° C.

The N-methyl-indole-2-aldehyde described in Examples 19 and 20 is obtained in the following manner.

A solution of 39.3 grams of N-methyl-indole in 150 cc. of absolute ether is mixed in an atmosphere of nitrogen with 250 cc. of a 1.4 N-solution of lithium butyl in absolute ether, and the whole is boiled under reflux for 3½ hours. The mixture is cooled to 5° C., and a solution of 40.5 grams of N-methyl-N-formyl-aniline in 100 cc. of absolute ether is added dropwise, while stirring.

After boiling the reaction solution for a further 3 hours under reflux, it is poured while stirring into a mixture of 300 cc. of 2 N-hydrochloric acid and 150 grams of ice.

A further 100 cc. of ether are added and the ethereal layer is separated in a separating funnel from the aqueous layer. The ethereal solution is washed three times with 50 cc. of ice water on each occasion, then dried over magnesium sulfate and evaporated in vacuo.

The residue is distilled in a high vacuum, whereby in addition to a small amount of forerunnings of N-methyl-indole, there are obtained 28 grams of pure N-methyl-indole-(2)-aldehyde boiling at 90–95° C. under 0.02 mm. pressure.

The aldehyde crystallizes throughout and melts at 83–85° C.

*Example 21*

4.0 grams of 4:7-phenanthroline-5:6-quinone, 3 grams of β-piperidino-ethoxy-amine and 1.4 grams of sodium acetate are heated in 200 cc. of methanol under reflux for 8 hours. After cooling the mixture, it is filtered to remove a small amount of undissolved precipitate and the chloric acid and evaporated. The residue is taken up in 100 cc. of aqueous 2 N-hydrochloric acid, the mixture is adjusted to a pH value of 8 with concentrated ammonia solution, and then extracted with chloroform. After evaporating the chloroform a brown oil remains behind. The latter is mixed with 20 cc. of aqueous 1 N-hydrochloric acid and evaporated. Theresidue is taken up in a mixture of methanol and ethyl acetate and concentrated somewhat. Upon trituration the dihydrochloride of 4:7-phenanthroline - 5:6-quinone-O-(β-piperidino-ethyl)-monoxime of the formula

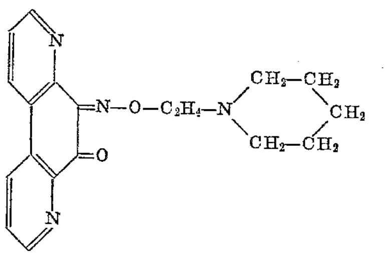

.2 HCl is precipitated in the form of a yellow crystalline product melting at 195° C.

β-Piperidino-ethoxy-amine is prepared from acetone-oxime and N-(β-chlorethyl)-piperidine in a manner analogous to that described for β-diethylamino or β-dimethyl-amino-ethoxy-amine. Its dihydrochloride is obtained in the form of white crystals melting at 172–173° C.

*Example 22*

A solution of 10.58 grams of sodium in 200 cc. of absolute alcohol is added to 24.4 grams of pyridine-(2)-aldoxime, 44.2 grams of β-piperidino-ethyl chloride hydrochloride are added and the whole is boiled for 3 hours under reflux. The reaction mixture is evaporated to dryness under reduced pressure. The resulting residue is dissolved in 100 cc. of 2 N-sodium hydroxide solution and the solution is extracted with chloroform. The chloroform solution is washed again with 2 N-sodium hydroxide solution and then with water. The residue from the evaporated chloroform solution is fractionated in high vacuum. There is obtained O-(β-piperidino-ethyl)-pyridine-(2)-aldoxime of the formula

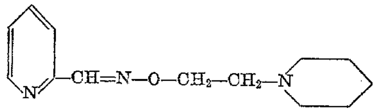

in the form of an oil boiling at 110–111° C. under 0.15 mm. of pressure.

In order to prepare the hydrochloride 7.47 grams of the above base are dissolved in a little alcohol, 7.8 cc. of 4.1 N-alcoholic hydrochloric acid are added and the whole is evaporated under reduced pressure. On the addition of ether the mono-hydrochloride of O-(β-piperidino-ethyl)-pyridine-(2)-aldoxime crystallizes and has the melting point 157–158° C.

*Example 23*

20 cc. of methyliodide are added to a solution of 11.65 grams of O-(β-piperidino-ethyl)-pyridine-(2)-aldoxime in 100 cc. of absolute alcohol, and the whole is boiled under reflux for 30 minutes. After cooling, ether is added, whereupon O-[β-(N-methyl-piperidinium)-ethyl] N - methyl - pyridinium-(2)-aldoxime-di-iodide separates which, after being recrystallized once from alcohol of 90% strength, melts at 213–214° C.

From the mother liquor of the reaction solution there crystallizes on the addition of a large quantity of ether the monomethoiodide of O-(β-piperidino-ethyl)-pyridine-(2)-aldoxime which after being recrystallized once from a mixture of alcohol and ether melts at 118–120° C.

*Example 24*

A solution of 10.58 grams of sodium in 200 cc. of absolute alcohol is added to 24.4 grams of pyridine-(3)-aldoxime. 44.8 grams of β-morpholino-ethyl chloride hydrochloride are then added and the whole is boiled under reflux for 3 hours. For the purpose of working up the product, the separated sodium chloride is filtered off and the filtrate is evaporated under reduced pressure. The resulting residue is fractionated in high vacuum. There is obtained O - (β - morpholino - ethyl)-pyridine-(3)-aldoxime of the formula

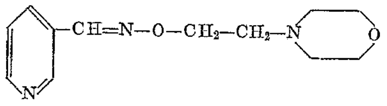

as an oil boiling at 141–143° C. under 0.15 mm. of pressure.

In order to prepare the hydrochloride 11.03 grams of the above base are dissolved in a little absolute alcohol and 47 cc. of 1 N-hydrochloric acid are added, and the mixture is evaporated to dryness under reduced pressure. The resulting monohydrochloride of O-(β-morpholino-ethyl)-pyridine-(3)-aldoxime melts at 163–165° C.

*Example 25*

18.7 cc. of methyliodide are added to a solution of 11 grams of O-(β-morpholino-ethyl)-pyridine-(3)-aldoxime and the whole is boiled for 30 minutes under reflux.

Whilst still boiling, O[β-(N-methyl-morpholinium)-ethyl]-N-methyl-pyridinium-(3)-aldoxime di-iodide separates and melts at 210–220° C.

*Example 26*

A solution of 10.58 grams of sodium in 200 cc. of absolute alcohol is added to 24.4 grams of pyridine-(2)-aldoxime; 44.8 grams of γ-diethyl-amino-propyl-chloride hydrochloride are added and the whole is boiled for 3 hours under reflux. After cooling, the separated sodium chloride is filtered off, and the filtrate is evaporated to dryness under reduced pressure. The residue is taken up in chloroform and the chloroform solution is washed twice with 2 N-sodium hydroxide solution and once with water. The chloroform solution is then dried and evaporated. The residue is fractionated in high vacuum. O-(γ-diethylamino-propyl) - pyridine - (2) - aldoxime of the formula

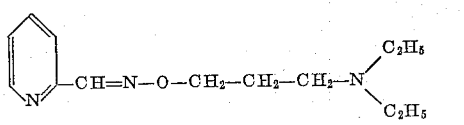

boils at 134° C. under 0.15 mm. of pressure.

In order to prepare the monohydrochloride, 8.99 grams of the above base are dissolved in a little alcohol. 38.4 cc. of 1 N-hydrochloric acid are added to this solution and the whole is evaporated to dryness under reduced pressure. The hydrochloride of O-(γ-diethylamino-propyl)-pyridine-(3)-aldoxime is obtained which melts at 111–112° C.

*Example 27*

27.2 cc. of methyliodide are added to a solution of 10.27 grams of O-(γ-diethylamino-propyl)-pyridine-(2)-aldoxime in 100 cc. of absolute alcohol and the whole is boiled under reflux for one hour. After cooling, ether is added, whereupon O-[γ - (diethyl - methyl - ammonium)-propyl]-N-methyl-pyridinium-(2)-aldoxime di-iodide separates which, after being recrystallized once from a mixture of alcohol and ether, melts at 176–178° C.

*Example 28*

12.1 grams of 2-acetyl-pyridine are boiled with 13.2 grams of β-diethylamino-ethoxy-amine in 100 cc. of absolute alcohol for 8 hours under reflux under nitrogen. The reaction solution is evaporated. By fractional distillation of the residue there is obtained O-(β-diethyl-amino-ethyl)-pyridine-(2)-acetoxime of the formula

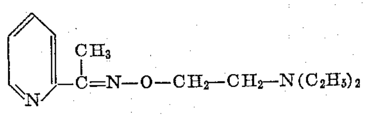

as an oil boiling at 100° C. under 0.03 mm. of pressure.

In order to prepare the monohydrochloride, 7.06 grams of the above base are dissolved in 120 cc. of absolute alcohol, 30 cc. of 1 N-hydrochloric acid are added and the whole is evaporated to dryness under reduced pressure. The residue is recrystallized once from a mixture of alcohol and ether. The resulting hydrochloride of O-(β-diethylamino-ethyl) - pyridine-(2)-acetoxime melts at 130–131° C.

*Example 29*

15 grams of pyridine-(3)-acetoxime are added to a solution of 2.6 grams of sodium in 100 cc. of absolute alcohol; 20 grams of β-diethylamino-ethyl chloride are added and the whole is boiled under reflux for 4 hours. The cooled reaction solution is filtered, evaporated under reduced pressure, 100 cc. of 1 N-sodium hydroxide solution are added and the solution is extracted with chloroform. The chloroform extract is washed with water, dried over magnesium sulfate and evaporated. The residue is distilled in high vacuum, O-(β-diethylamino-ethyl)-pyridine-(3)-acetoxime of the formula

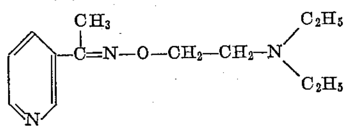

being obtained in the form of a faintly brown oil boiling at 118–120° C. under 0.05 mm. of pressure.

*Example 30*

8 grams of O-(β-diethylamino-ethyl)-pyridine-(3)-acetoxime are dissolved in 50 cc. of absolute alcohol and boiled with 29.5 grams of methyliodide under reflux for one hour. After cooling, a little ether is added. The crystals are suction-fitered and recrystallized from a mixture of alcohol and ether. There is obtained O-(β-diethyl - methylammonium ethyl) - N - methyl - pyridinium-(3)-acetoxime di-iodide melting at 161–162° C. with decomposition.

*Example 31*

15 grams of pyridine-(4)-acetoxime are added to a solution of 2.6 grams of sodium in 100 cc. of absolute alcohol, 20 grams of β-diethylamino-ethyl chloride are added and the whole is boiled for 4 hours under reflux. The cooled reaction solution is filtered, evaporated under reduced pressure, 100 cc. of 1 N-sodium hydroxide solution are added and the solution extracted with chloroform. The chloroform extract is washed with water, dried over magnesium sulfate and evaporated, and the residue distilled in high vacuum, O-(β-diethyl-amino-ethyl)-pyridine-(4)-acetoxime of the formula

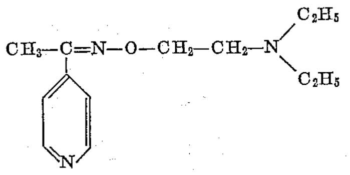

being obtained in the form of a faintly brown oil boiling at 106–108° C. under 0.07 mm. of pressure.

*Example 32*

9 grams of O-(β-diethylamino-ethyl)-pyridine-(4)-acetoxime are dissolved in 70 cc. of absolute alcohol and boiled with 32.7 grams of methyliodide for one hour under reflux. After cooling, a little ether is added. The crystals are suction-filtered and then recrystallized from a mixture of alcohol and ether. There is obtained O-(β-diethyl - methyl - ammonium - ethyl) - N - methyl - pyridinium-(4)-acetoxime di-iodide melting at 170–172° C. with decomposition.

*Example 33*

A solution of 2.53 grams of sodium in 100 cc. of absolute alcohol is added to 14.1 grams of thiophene-2-acetoxime; 17 grams of β-diethylamino-ethyl chloride are then added and the whole is boiled for 3 hours under reflux. After cooling, the sodium chloride is filtered off and the filtrate is evaporated. To the residue there are added 50 cc. of 2 N-sodium hydroxide solution and the solution is extracted with chloroform. The chloroform solution is washed again with 1 N-sodium hydroxide solution and once with water. After evaporating the chloroform solution, the residue is fractionated. There is obtained O-(β-diethylamino-ethyl)-thiophene-2-acetoxime of the formula

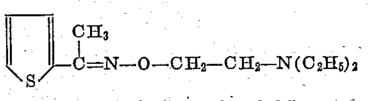

as an oil boiling at 117° C. under 0.25 mm. of pressure.

In order to prepare the hydrochloride, 1.1 grams of the above base are dissolved in a little alcohol, 4.44 cc.

of 1 N-hydrochloric acid are added and the whole is evaporated to dryness. The residue is the hydrochloride of O-(β-diethylamino-ethyl)-thiophene-2-acetoxime melting at 111–114° C.

*Example 34*

A solution of 2.53 grams of sodium in 100 cc. of absolute alcohol is added to 12.2 grams of pyridine-(2)-aldoxime. 17.6 grams of β-diethyl-amino-ethyl chloride in 100 cc. of absolute alcohol are added with agitation, and the whole is then boiled under reflux for 3 hours. After cooling, the separated sodium chloride is filtered off, the filtrate is evaporated and the residue distilled in high vacuum. There is obtained the O-(β-diethyl-amino-ethyl)-pyridine-(2)-aldoxime described in Example 3.

*Example 35*

A solution of 2.53 grams of sodium in 100 cc. of absolute alcohol is added to 12.2 grams of pyridine-(2)-aldoxime. 10.4 grams of ethylene chlorhydrin are added and the whole is boiled for 3 hours under reflux. After cooling, the separated sodium chloride is filtered off, and the filtrate evaporated. The resulting residue is dissolved in 2 N-sodium hydroxide solution and the solution extracted with chloroform. After evaporating the chloroform solution, the residue is distilled in high vacuum. O-(β-hydroxy-ethyl)-pyridine-(2)-aldoxime of the formula

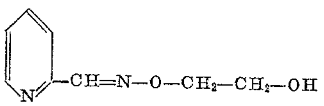

boils at 104–105° C. under 0.2 mm. of pressure. Its melting point lies at 48–50° C.

16.6 grams of O-(β-hydroxy-ethyl)-pyridine-(2)-aldoxime are added in portions with stirring and ice-cooling to 150 cc. of thionyl chloride. The whole is then stirred for 5 hours at an internal temperature of 30–35° C. The reaction solution is evaporated under reduced pressure at a temperature of 60° C. at the most. The resulting residue is dissolved in 25 cc. of water, 60 cc. of 2 N-sodium carbonate solution are added and then saturated sodium carbonate solution until the reaction is alkaline, the solution is then extracted with chloroform. After evaporating the chloroform solution, the residue is distilled in a high vacuum. O-(β-chlorethyl)-pyridine-(2)-aldoxime of the formula

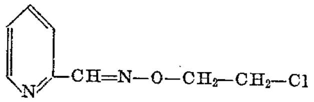

boils at 73–75° C. under 0.15 mm. of pressure.

3.88 grams of O-(β-chlorethyl)-pyridine-(2)-aldoxime are heated with 50 cc. of diethylamine for 12 hours in a bomb tube at 130–140° C. After cooling, the reaction solution is evaporated under reduced pressure, 50 cc. of 2 N-sodium hydroxide solution are added to the residue and the solution is extracted with chloroform. The residue from the chloroform solution is subjected to fractional distillation in high vacuum. There is obtained the O-(β-diethylamino-ethyl)-pyridine-(2)-alodxime described in Example 3.

*Example 36*

6.48 grams of 1-phenyl-2:3-dimethyl-5-oxo-2:5-dihydropyrazole-(4)-aldehyde are boiled under reflux with 3.96 grams of diethyl-amino-ethoxy-amine in 80 cc. of absolute alcohol for 8 hours. The whole is evaporated under reduced pressure and the residue is dissolved in a little absolute alcohol. Aqueous 1 N-hydrochloric acid is added to the solution until the latter shows a pH value of 6; the solution is then evaporated. The resulting residue is recrystallized from a mixture of alcohol and ether. There is thus obtained the hydrochloride of O-(β-diethyl-amino-ethyl)-1-phenyl-2:3-dimethyl-5-oxo-2:5-dihydro-pyrazole-(4)-aldoxime of the formula

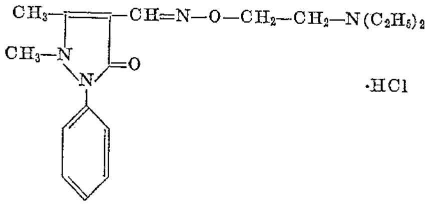

melting at 180–181° C.

*Example 37*

6.48 grams of 1-phenyl-2:3-dimethyl-5-oxo-2:5-dihydropyrazole-(4)-aldehyde are boiled under reflux for 8 hours with 3.96 grams of diethylamino-ethoxy-amine in 80 cc. of absolute alcohol. The whole is evaporated in vacuo and the residue is dissolved in 90 cc. of absolute alcohol, 12 cc. of methyliodide are added and the mixture is boiled for 20 minutes under reflux. After cooling, ether is added, whereupon crystallization sets in. The crystals are suction-filtered and recrystallized once from a mixture of alcohol and ether. There is obtained O-(β-diethyl-methyl-ammonium-ethyl)-1-phenyl-2:3-dimethyl-5-oxo-2:5-dihydro-pyrazole-(4)-aldoxime-iodide of the formula

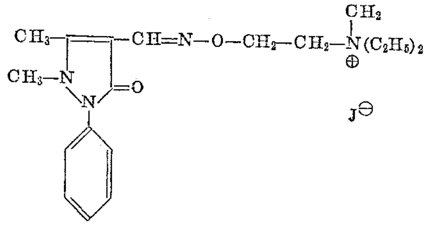

melting at 199–199.5° C.

What is claimed is:

1. O-(β-hydroxy-ethyl)-pyridine-(2)-aldoxime.

2. O-(β-chloroethyl)-pyridine-(2)-aldoxime.

3. A member of the group consisting of O:O′-bis-(di-lower alkylamino-lower alkyl)-pyridine-(2:6)-dialdoxime, its therapeutically useful acid addition salts and lower alkyl quaternary ammonium salts.

4. A member of the group consisting of O:O′-bis-(β-dimethylamino-ethyl)-pyridine-(2:6)-dialdoxime, its therapeutically useful acid addition salts and lower alkyl quaternary ammonium salts.

5. A member of the group consisting of therapeutically useful acid addition salts and lower alkyl quaternary ammonium salts of compounds of the formula:

$$R-\overset{\overset{R'}{|}}{C}=N-O-X-R''$$

in which R stands for a member selected from the group consisting of quinolyl, pyrazolyl, indolyl, pyridyl, N-methyl-indolyl, oxo-phenanthrolyl and 1-phenyl-2,3-dimethyl-5-oxo-2,5-dihydropyrazolyl-(4), R′ stands for the group $-(CH_2)_nH$ wherein *n* is an integer from 0 to 6, X stands for lower alkylene and R″ represents a member selected from the group consisting of di-(lower alkyl)-amino, pyrrolidino, piperidino, piperazino and morpholino.

6. Therapeutically useful lower alkyl quaternary ammonium salts of compounds of the formula $$R-\overset{\overset{R'}{|}}{C}=N-O-X-R''$$

wherein R represents pyridyl, R′ stands for the group $-(CH_2)_nH$ wherein *n* is an integer from 0 to 6, X is lower alkylene and R″ represents di-lower alkyl-amino.

7. Therapeutically useful lower alkyl quaternary ammonium salts of compounds of the formula $$R-\overset{\overset{R'}{|}}{C}=N-O-X-R''$$

wherein R represents pyridyl, R′ stands for the group $—(CH_2)_nH$ wherein $n$ is an integer from 0 to 6, X is lower alkylene and R″ represents pyrrolidino.

8. Therapeutically useful lower alkyl quaternary ammonium salts of compounds of the formula $$R-\overset{\overset{R'}{|}}{C}=N-O-X-R''$$

wherein R represents pyridyl, R′ stands for the group $—(CH_2)_nH$ wherein $n$ is an integer from 0 to 6, X is lower alkylene and R″ represents piperazino.

9. Therapeutically useful lower alkyl quaternary ammonium salts of compounds of the formula $$R-\overset{\overset{R'}{|}}{C}=N-O-X-R''$$

wherein R represents pyridyl, R′ stands for the group $—(CH_2)_nH$ wherein $n$ is an integer from 0 to 6, X is lower alkylene and R″ represents morpholino.

10. Therapeutically useful lower alkyl quaternary ammonium salts of compounds of the formula $$R-\overset{\overset{R'}{|}}{C}=N-O-CH_2-CH_2-R''$$

wherein R is pyridyl, R′ stands for the group $—(CH_2)_nH$ wherein $n$ is an integer from 0 to 1 and R″ is di-lower alkylamino.

11. Therapeutically useful lower alkyl quaternary ammonium salts of compounds of the formula $$R—CH{=}N—OCH_2—CH_2—N(C_2H_5)_2$$

wherein R is pyridyl.

12. Therapeutically useful lower alkyl quaternary ammonium salts of compounds of the formula $$R—CH{=}N—OCH_2—CH_2—N(CH_3)_2$$

wherein R is pyridyl.

13. Therapeutically useful lower alkyl quaternary ammonium salts of O-($\beta$-diethylamino-ethyl)-pyridine-(4)-aldoxime.

14. Therapeutically useful lower alkyl quaternary ammonium salts of O-($\beta$-diethylamino-ethyl)-pyridine-(3)-aldoxime.

15. Therapeutically useful lower alkyl quaternary ammonium salts of O-($\beta$-diethylamino-ethyl)-pyridine-(2)-aldoxime.

16. A compound of the formula $$R-\overset{\overset{R'}{|}}{C}=N-O-X-R''$$

wherein R represents a pyridyl radical, R′ stands for a group of the formula $—(CH_2)_nH$ wherein $n$ is an integer from 0 to 6, X is a lower alkylene radical and R″ is a member selected from the group consisting of hydroxy, halogen and monocyclic carbocyclic aryl sulfonyloxy.

17. A member of the group consisting of therapeutically useful acid addition salts and lower alkyl quaternary ammonium salts of compounds of the formula $$R-\overset{\overset{R'}{|}}{C}=N-O-X-R''$$

wherein R represents pyridyl, R′ stands for the group $—(CH_2)_nH$ wherein $n$ is an integer from 0 to 6, X is lower alkylene and R″ represents piperidino.

18. A member of the group consisting of thereapeutically useful acid addition salts and lower alkyl quaternary ammonium salts of compounds of the formula:

$$R-\overset{\overset{R'}{|}}{C}=N-O-X-R''$$

in which R stands for a member selected from the group consisting of furyl, thienyl and 5-nitro furyl, R′ stands for the group $—(CH_2)_nH$ wherein $n$ is an integer from 0 to 6, X stands for lower alkylene and R″ represents a member selected from the group consisting of di-(lower alkyl)-amino, pyrrolidino, piperidino, piperazino and morpholino.

19. Therapeutically useful acid addition salts of compounds of the formula $$R-\overset{\overset{R'}{|}}{C}=N-O-X-R''$$

wherein R represents pyridyl, R′ stands for the group $—(CH_2)_nH$ wherein $n$ is an integer from 0 to 6, X is lower alkylene and R″ represents di-lower alkylamino.

20. Therapeutically useful acid addition salts of compounds of the formula $$R-\overset{\overset{R'}{|}}{C}=N-O-X-R''$$

wherein R represents pyridyl, R′ stands for the group $—(CH_2)_nH$ wherein $n$ is an integer from 0 to 6, X is lower alkylene and R″ represents pyrrolidino.

21. Therapeutically useful acid addition salts of compounds of the formula $$R—CH{=}N—OCH_2—CH_2—N(C_2H_5)_2$$

wherein R is pyridyl.

References Cited by the Examiner

UNITED STATES PATENTS 3,060,177 10/62 Druey et al. ---------- 260—296

IRVING MARCUS, *Primary Examiner.*

NICHOLAS S. RIZZO, WALTER A. MODANCE, *Examiners.*